US009443524B2

(12) United States Patent
Wu et al.

(10) Patent No.: US 9,443,524 B2
(45) Date of Patent: Sep. 13, 2016

(54) STEREO DECODING METHOD AND APPARATUS

(75) Inventors: Wenhai Wu, Beijing (CN); Lei Miao, Beijing (CN); Yue Lang, Munich (DE); Qi Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1148 days.

(21) Appl. No.: 13/437,552

(22) Filed: Apr. 2, 2012

(65) Prior Publication Data

US 2012/0189127 A1 Jul. 26, 2012

Related U.S. Application Data

(63) Continuation of application No. PCT/CN2010/079413, filed on Dec. 3, 2010.

(30) Foreign Application Priority Data

Feb. 12, 2010 (CN) .......................... 2010 1 0111432

(51) Int. Cl.
*H04R 5/00* (2006.01)
*G06F 17/00* (2006.01)
*G10L 19/008* (2013.01)

(52) U.S. Cl.
CPC .................................... *G10L 19/008* (2013.01)

(58) Field of Classification Search
CPC ............ H04S 3/02; H04S 1/007; H04S 5/00; G10L 19/008
USPC ................................. 700/94; 381/17, 22, 23
See application file for complete search history.

(56) References Cited

U.S. PATENT DOCUMENTS

2005/0177360 A1 8/2005 Schuijers et al.
2007/0127729 A1 6/2007 Breebaart et al.
2008/0126104 A1* 5/2008 Seefeldt ................ G10L 19/008 704/503
2009/0043591 A1 2/2009 Breebaart et al.

FOREIGN PATENT DOCUMENTS

CN 1669358 A 9/2005
CN 101313355 A 11/2008

(Continued)

OTHER PUBLICATIONS

Written Opinion issued in corresponding PCT application No. PCT/CN2010/079413 , dated Mar. 10, 2011, total 5 pages.

(Continued)

*Primary Examiner* — Vivian Chin
*Assistant Examiner* — Douglas Suthers
(74) *Attorney, Agent, or Firm* — Leydig, Voit & Mayer, Ltd.

(57) ABSTRACT

A stereo decoding method and apparatus are disclosed. The method includes: restoring a monophonic signal from a received code stream through decoding; restoring an interchannel level difference, a group delay, and a group phase from the received code stream through decoding; and processing the monophonic signal according to the interchannel level difference, group delay, and group phase to obtain a first channel signal and a second channel signal. According to the stereo decoding method and apparatus provided in embodiments of the present invention, the first and second channel signals are obtained according to the monophonic signal, ILD, group delay, and group phase by referring to not only the ILD but also the group delay and group phase, thereby yielding favorable stereo sound field effect for the obtained first and second channel signals.

14 Claims, 12 Drawing Sheets

(56) References Cited

FOREIGN PATENT DOCUMENTS

| | | | |
|---|---|---|---|
| CN | 101390443 | A | 3/2009 |
| EP | 2138999 | A1 | 12/2009 |
| JP | 63264000 | A | 10/1988 |
| WO | 2009084920 | A1 | 7/2009 |

OTHER PUBLICATIONS

International search report for International application No. PCT/CN2010/079413, dated Mar. 10, 2011, and an English translation thereof, total 19 pages.

* cited by examiner

STEREO DECODING METHOD AND APPARATUS

CROSS-REFERENCE TO RELATED APPLICATIONS

This application is a continuation of International Application No. PCT/CN2010/079413, filed on Dec. 3, 2010, which claims priority to Chinese Patent Application No. 201010111432.1, filed on Feb. 12, 2010, both of which are hereby incorporated by reference in their entireties.

FIELD OF THE INVENTION

The present invention relates to the field of communications technologies, and in particular, to a stereo decoding method and apparatus.

BACKGROUND OF THE INVENTION

At present, stereo encoding methods mainly include coding methods, such as strength stereo, BBC (Binaual Cure Coding) and PS (Parametric-Stereo coding). In communications scenarios of medium and high code rates, the common encoding method is to extract the interchannel (for example, left and right channels) level difference (Inter-Channel Level Difference, ILD) (also known as CLD) and interchannel phase difference (InterChannel Phase Difference, IPD). In certain cases, the interrelation parameters of two channels and phase difference parameters between down-mixed signals and one of the channels may also be extracted. The parameters served as side information are encoded and sent to a decoding end, so as to restore a stereo signal. However, in communication scenarios with low code rates, ILD and IPD cannot be transmitted simultaneously. The ILD is required to be transmitted with priority. The ILD is encoded and sent to the decoding end to restore the stereo signal.

According to the preceding stereo encoding method, the corresponding stereo decoding method is as follows: extracting a monophonic bit signal from a code stream, obtaining a monophonic signal after decoding, and obtaining a monophonic frequency-domain signal after performing time-frequency conversion for the monophonic signal; in the scenarios of medium and high code rates, extracting an ILD and IPD from the code stream, and obtain a left channel frequency-domain signal and a right channel frequency-domain signal according to the monophonic frequency-domain signal and ILD and IPD; in the scenarios of low code rates, extracting an ILD from the code stream, and obtain a left channel frequency-domain signal and a right channel frequency-domain signal according to the monophonic frequency-domain signal and ILD; and obtaining a left channel signal and a right channel signal after performing frequency-time conversion for the left channel frequency-domain signal and right channel frequency-domain signal, respectively.

The stereo decoding method in the communication scenario with low code rates refers to only the ILD to achieve the sound field effect. That is, the signal obtained by using the decoding method includes only the energy value information between two channels of signals, thereby causing poor effects of the stereo sound field of the left channel signal and right channel signal.

SUMMARY OF THE INVENTION

Embodiments of the present invention provide a stereo decoding method and apparatus.

An embodiment of the present invention provides a stereo decoding method. The method includes:

restoring a monophonic signal from a received code stream through decoding;

restoring an interchannel level difference, a group delay, and a group phase from the received code stream through decoding; and processing the monophonic signal according to the interchannel level difference, group delay, and group phase to obtain a first channel signal and a second channel signal.

An embodiment of the present invention provides a stereo decoding apparatus. The apparatus includes:

a signal decoding module, configured to restore a monophonic signal from a received code stream through decoding;

a parameter decoding module, configured to restore an interchannel level difference, a group delay, and a group phase from the received code stream through decoding; and a signal acquiring module, configured to process the monophonic signal according to the interchannel level difference, group delay, and group phase to obtain a first channel signal and a second channel signal.

BRIEF DESCRIPTION OF THE DRAWINGS

To better illustrate the technical solutions according to the present invention or in the prior art, the accompanying drawings used for describing the embodiments of the present invention or the prior art are briefly described in the following. Apparently, the accompanying drawings in the following description are merely about some embodiments of the present invention, and those skilled in the art can derive other drawings based on the accompanying drawings without creative efforts.

DETAILED DESCRIPTION OF THE EMBODIMENTS

The technical solutions according to the embodiments of the present invention are described clearly and completely with reference to accompanying drawings of the embodiments of the present invention. Evidently, the embodiments to be described below are merely some rather than all embodiments of the present invention. All other embodiments derived by those skilled in the art from the embodiments of the present invention without making any creative effort shall fall within the protection scope of the present invention.

Figure 1:
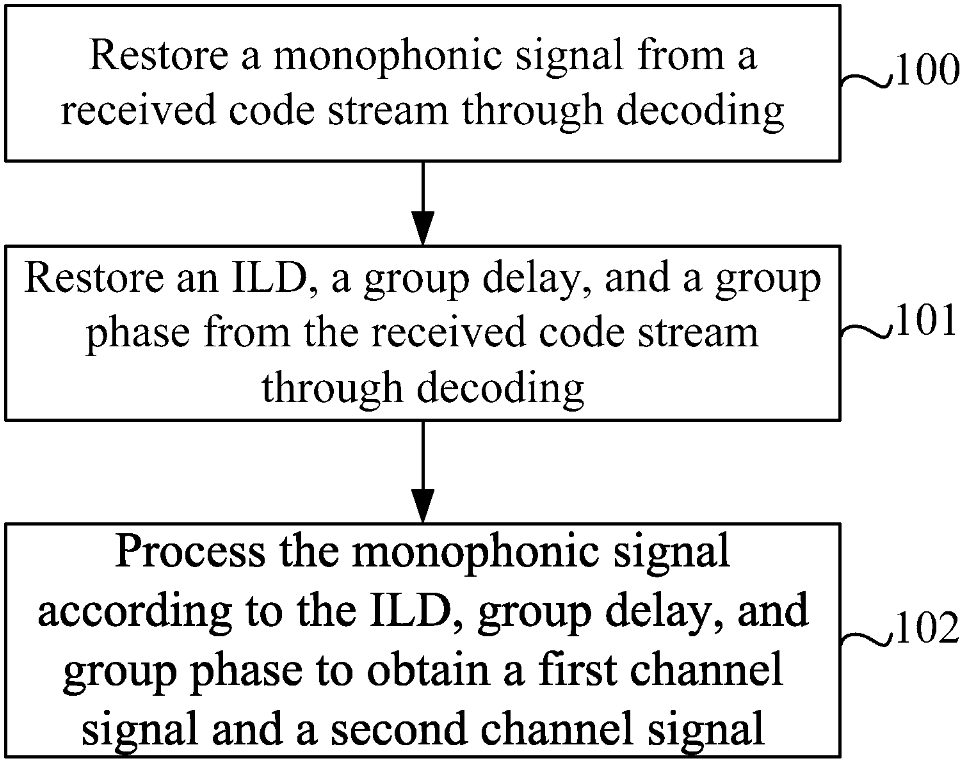
FIG. 1 is a flowchart of a stereo decoding method provided in a first embodiment of the present invention.

FIG. 1 is a flowchart of a stereo decoding method provided in a first embodiment of the present invention. As shown in FIG. 1, the embodiment includes the following steps:

Step 100: Restore a monophonic signal from a received code stream through decoding.

Step 101: Restore an ILD, a group delay (group delay), and a group phase (group phase) from the received code stream through decoding.

The group delay indicates global sphere information of time delay of an envelope between two channels of signals, and the group phase indicates global information about waveform similarity of two channels of signals after time alignment.

Step 102: Process the monophonic signal according to the ILD, group delay, and group phase to obtain a first channel signal and a second channel signal.

The stereo decoding method provided in the embodiment is applicable to a communication scenario with a low code rate. The received code stream includes an encoded monophonic signal, and at least includes an encoded ILD, group delay, and group phase. The group delay and group phase occupy a few bandwidth resources and two global phases and similarity information are used to enhance sound field effect, thereby improving the sound field effect in the low code rate. According to the stereo decoding method provided in the embodiment, a first channel signal and a second channel signal are obtained according to the monophonic signal, ILD, group delay, and group phase, so that the obtained signal contains energy value information between two channels of signals by referring to the ILD, and the obtained signal contains global time delay information and global waveform similarity information between two channels of signals by referring to the group delay and the group phase, thereby yielding favorable stereo sound field effect for the obtained first channel signal and second channel signal.

The embodiment of the present invention may be applicable to a communication scenario with a low code rate. Specifically, on the basis of the first embodiment, step 102 may include: obtaining a monophonic frequency-domain signal after performing time-frequency conversion for the monophonic signal; obtaining an IPD estimate value according to the group delay and group phase; processing the monophonic frequency-domain signal according to the ILD and the IPD estimate value to obtain a first channel frequency-domain signal and second channel frequency-domain signal; obtaining a first channel signal and second channel signal after performing frequency-time conversion for the first channel frequency-domain signal and second channel frequency-domain signal, respectively. The following further describes the technical solution through second and third embodiments.

Figure 2A:
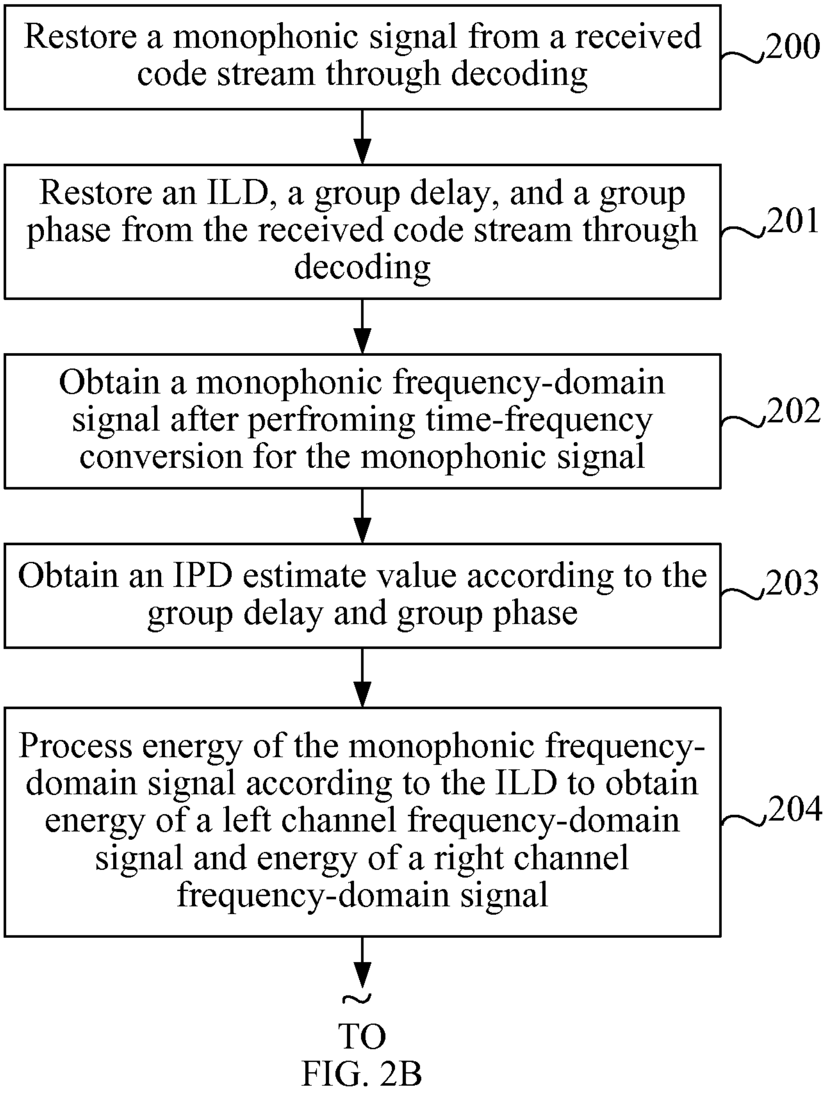
FIGS. 2*a* and 2*b* are flowcharts of a stereo decoding method provided in a second embodiment of the present invention.
Figure 2B:
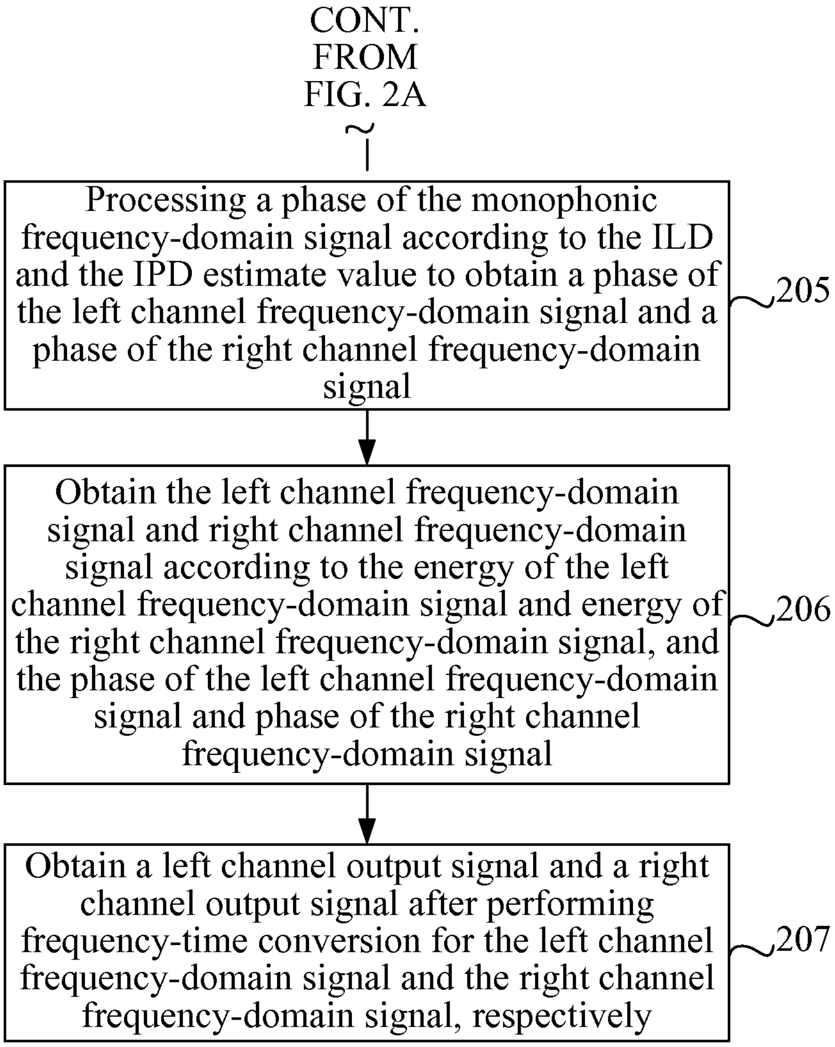

FIG. 2 is a flowchart of a stereo decoding method provided in a second embodiment of the present invention. In the embodiment, a first channel is a left channel, and a second channel is a right channel. As shown in FIG. 2, the embodiment includes the following steps:

Step 200: Restore a monophonic signal from a received code stream through decoding.

Specifically, a monophonic bit signal is extracted from the code stream, and is decoded by a monophonic signal (Mono) decoder to restore the monophonic signal. The monophonic signal is also called a down-mixed signal.

Step 201: Restore an ILD, a group delay, and a group phase from the received code stream through decoding.

The group delay is expressed as $d_g'$ and the group phase is expressed as $\theta_g'$. A sine signal sin(wt) becomes a sin(wt−Q) signal after the group phase. In sin(wt−Q)=sin (w(t−Q/w)), Q/w indicates the group phase (group phase). The group delay (group delay) is called an envelope delay. During signal transmission, the group delay indicates the speed at which a total phase shift changes with an angular frequency, that is, the slope of a phase-frequency characteristic curve. For an ordinary transmission system, a transmission function can be written as follows: H(jw)=A(w)−B(w), where A(w) indicates amplitude-frequency characteristic, and B(w) indicates phase-frequency characteristic: a derivative for w.t(w)=dB(w)/dw indicates the group delay of the transmission system.

Step 202: Obtain a monophonic frequency-domain signal after performing time-frequency conversion for the monophonic signal.

Time-frequency conversion is performed for the monophonic signal to obtain the monophonic frequency-domain signal. The monophonic frequency-domain signal is expressed as M'(k).

Step 203: Obtain an IPD estimate value according to the group delay and group phase.

The group delay $d_g'$ and group phase $\theta_g'$ are restored from the code stream through decoding. The IPD estimate value is obtained by using the formula (1.1):

$$IPD'(k) = \frac{-2\pi d_g' * k}{N} + \theta_g' \tag{1.1}$$

The frequency-domain signal is divided into a plurality of frequency bands. It is assumed that the frequency-domain signal is divided into M frequency bands, k indicates a frequency point index, b indicates a frequency band index, and N indicates a length of time-frequency conversion, where k=0, . . . , N−1, b=0, . . . , M−1. In formula (1.1), IPD'(k) indicates the IPD estimate value of a frequency point whose index is k.

Step 204: Process energy of the monophonic frequency-domain signal according to the ILD to obtain energy of a left channel frequency-domain signal and energy of a right channel frequency-domain signal.

Specifically, the following formulas (1.2) and (1.3) are used to obtain the energy $|X'_1(k)|$ of the left channel frequency-domain signal and the energy $|X'_2(k)|$ of the right channel frequency-domain signal:

$$|X_1'(k)| = |M'(k)| * \frac{c(b)}{1 + c(b)} \tag{1.2}$$

$$|X_2'(k)| = |M'(k)| * \frac{1}{1 + c(b)} \tag{1.3}$$

$c(b)=10^{ILD'(b)/10}$, ILD'(b) indicates the ILD of a frequency band whose index is b, and |M'(k)| indicates the energy of the monophonic frequency-domain signal.

Step 205: Processing a phase of the monophonic frequency-domain signal according to the ILD and the IPD estimate value to obtain a phase of the left channel frequency-domain signal and a phase of the right channel frequency-domain signal.

Specifically, the following formulas (1.4) and (1.5) are used to obtain the phase $\angle X'_1(k)$ of the left channel frequency-domain signal and the phase $\angle X'_2(k)$ of the right channel frequency-domain signal:

$$\angle X_1'(k) = \angle M'(k) + \frac{1}{1+c(b)} IPD'(k) \tag{1.4}$$

$$\angle X_2'(k) = \angle M'(k) - \frac{c(b)}{1+c(b)} IPD'(k) \tag{1.5}$$

$\angle M'(k)$ indicates the phase of the monophonic frequency-domain signal.

In the step, the phase of the left channel frequency-domain signal and the phase of the right channel frequency-domain signal are calculated by replacing the IPD with IPD'(k) obtained by using the group delay $d_g'$ and the group phase $\theta_g'$.

Step 206: According to the energy of the left channel frequency-domain signal and the energy of the right channel frequency-domain signal, and the phase of the left channel frequency-domain signal and the phase of the right channel frequency-domain signal, obtain the left channel frequency-domain signal and the right channel frequency-domain signal.

Specifically, the following formulas (1.6) and (1.7) are used to obtain the left channel frequency-domain signal $X_1'(k)$ and the right channel frequency-domain signal $X_2'(k)$:

$$X_1'(k) = |X_1'(k)| * e^{j\angle X_1'(k)} \tag{1.6}$$

$$X_2'(k) = |X_2'(k)| * e^{j\angle X_2'(k)} \tag{1.7}$$

Step 207: Obtain a left channel output signal and a right channel output signal after performing frequency-time conversion for the left channel frequency-domain signal and the right channel frequency-domain signal, respectively.

The stereo decoding method provided in the embodiment is applicable to a communication scenario with a low code rate. The received code stream includes an encoded monophonic signal, and at least includes an encoded ILD, group delay, and group phase. The group delay and the group phase occupy a few bandwidth resources without affecting the code rate. According to the stereo decoding method provided in the embodiment, the energy of the left channel signal and the energy of the right channel signal are obtained by processing the energy of the monophonic frequency-domain signal according to the ILD, the phase of the left channel signal and the phase of the right channel signal are obtained by processing the phase of the monophonic frequency-domain signal according to the ILD and the IPD estimate value that is obtained through the group delay and group phase, so that the obtained signal contains not only the energy value information between two channels of signals but also contains time delay information and waveform similarity information between two channels of signals, thereby yielding favorable stereo sound field effect for the obtained left channel signal and right channel signal.

Figure 3A:
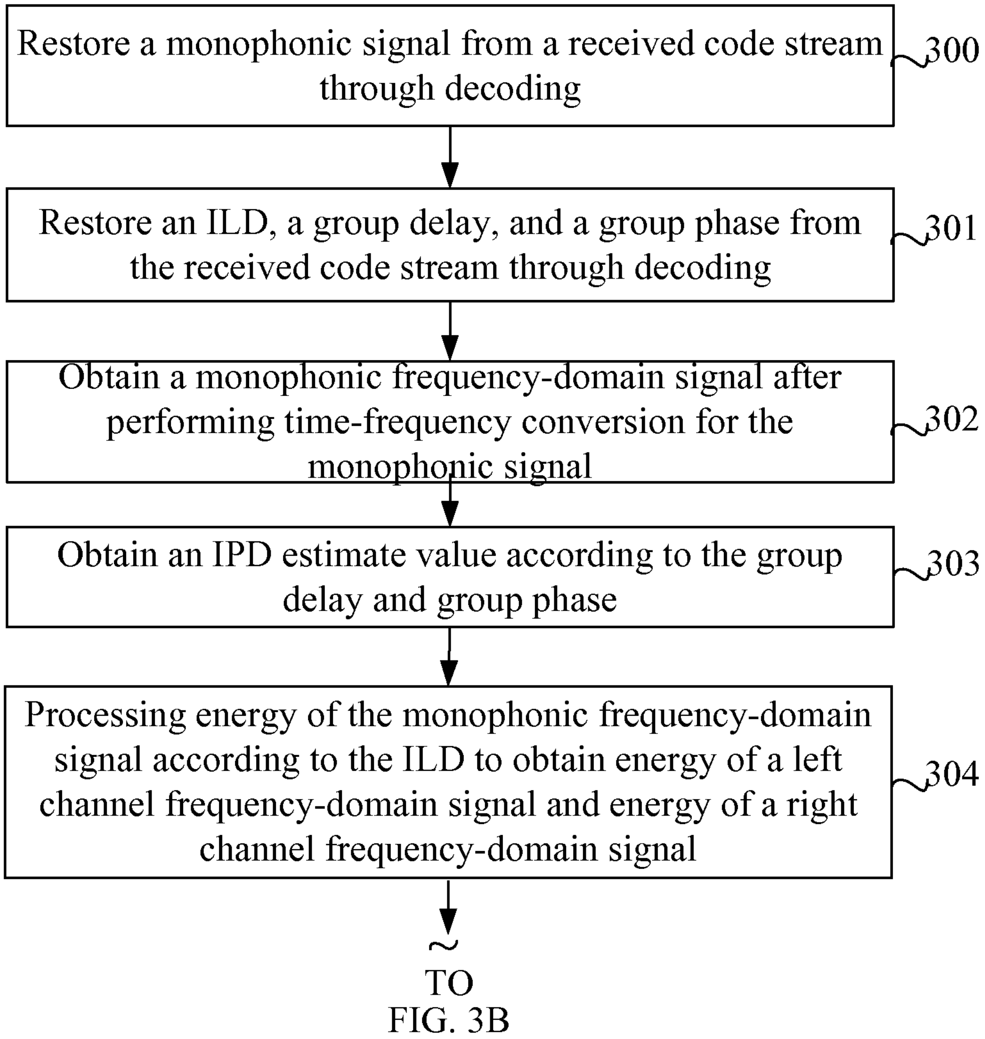
FIGS. 3*a* and 3*b* are flowcharts of a stereo decoding method provided in a third embodiment of the present invention.
Figure 3B:
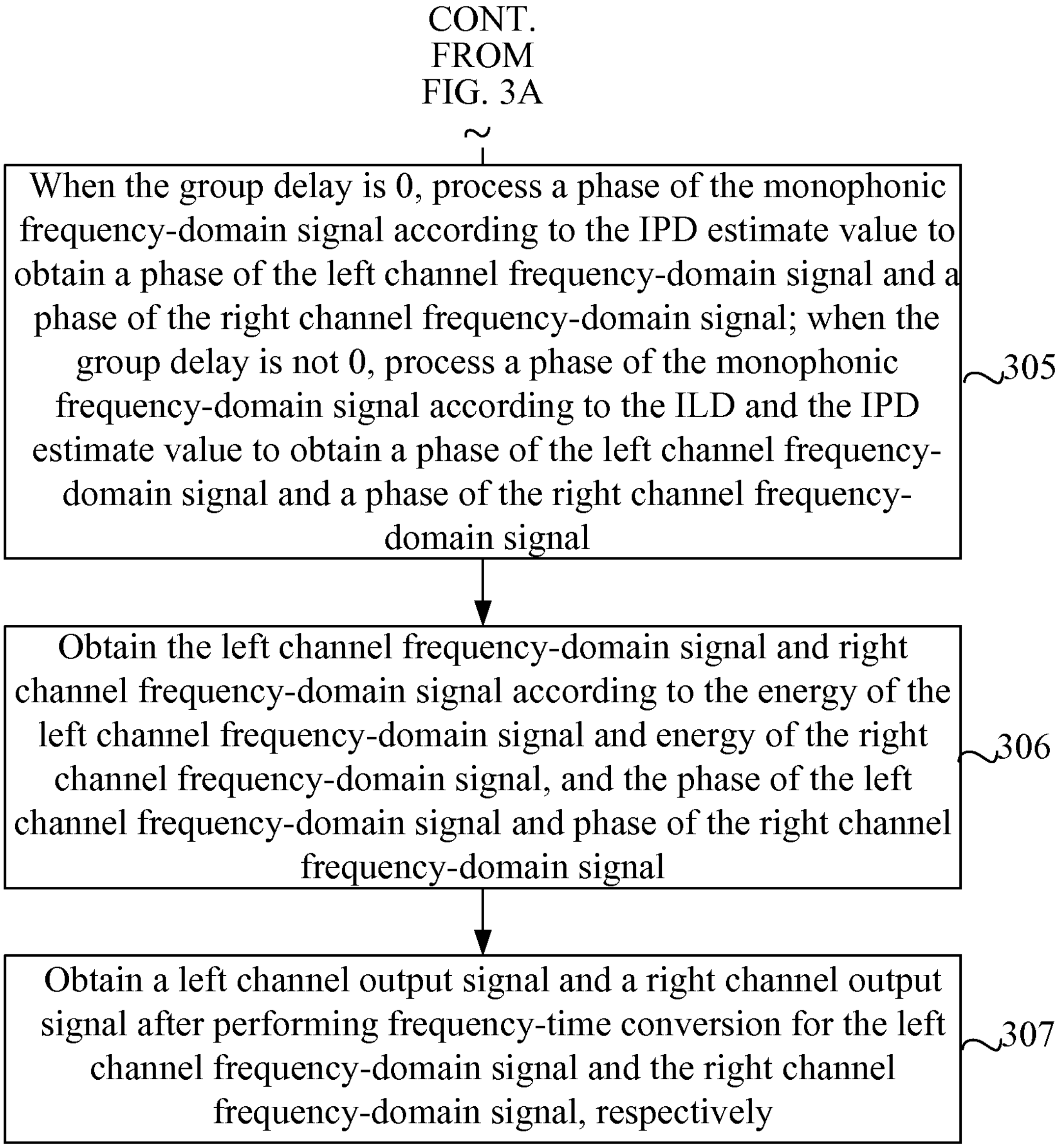

FIG. 3 is a flowchart of a stereo decoding method provided in a third embodiment of the present invention. In the embodiment, a first channel is a left channel, and a second channel is a right channel. As shown in FIG. 3, this embodiment includes the following steps:

Step 300: Restore a monophonic signal from a received code stream through decoding.

Specifically, a monophonic bit signal is extracted from the code stream, and is decoded by a monophonic signal (Mono) decoder to restore the monophonic signal. The monophonic signal is also called a down-mixed signal.

Step 301: Restore an ILD, a group delay, and a group phase from the received code stream through decoding.

The group delay is expressed as $d_g'$ and the group phase is expressed as $\theta_g'$.

Step 302: Obtain a monophonic frequency-domain signal after performing time-frequency conversion for the monophonic signal.

Time-frequency conversion is performed for the monophonic signal to obtain the monophonic frequency-domain signal. The monophonic frequency-domain signal is expressed as M'(k).

Step 303: Obtain an IPD estimate value according to the group delay and group phase.

The group delay $d_g'$ and the group phase $\theta_g'$ are restored from the code stream through decoding. The IPD estimate value is obtained by using the formula (2.1):

$$IPD'(k) = \frac{-2\pi d_g' * k}{N} + \theta_g' \tag{2.1}$$

The frequency-domain signal is divided into a plurality of frequency bands. It is assumed that the frequency-domain signal is divided into M frequency bands, k indicates a frequency point index, b indicates a frequency band index, and N indicates a length of time-frequency conversion, where k=0, . . . , N−1, b=0, . . . , M−1. In formula (2.1), IPD'(k) indicates the IPD estimate value of a frequency point whose index is k.

Step 304: Processing energy of the monophonic frequency-domain signal according to the ILD to obtain energy of a left channel frequency-domain signal and energy of a right channel frequency-domain signal.

Specifically, the following formulas (2.2) and (2.3) are used to obtain the energy $|X'_1(k)|$ of the left channel frequency-domain signal and the energy $|X'_2(k)|$ of the right channel frequency-domain signal:

$$|X_1'(k)| = |M'(k)| * \frac{c(b)}{1+c(b)} \tag{2.2}$$

$$|X_2'(k)| = |M'(k)| * \frac{1}{1+c(b)} \tag{2.3}$$

$c(b)=10^{ILD'(b)/10}$, ILD'(b) indicates the ILD of a frequency band whose index is b, and |M'(k)| indicates the energy of the monophonic frequency-domain signal.

Step 305: When the group delay is 0, process a phase of the monophonic frequency-domain signal according to the IPD estimate value to obtain a phase of the left channel frequency-domain signal and a phase of the right channel frequency-domain signal; when the group delay is not 0, process a phase of the monophonic frequency-domain signal according to the ILD and the IPD estimate value to obtain a phase of the left channel frequency-domain signal and a phase of the right channel frequency-domain signal.

Specifically, when $d_g'=0$, the following formulas (2.4) and (2.5) are used to obtain the phase $\angle X'_1(k)$ of the left channel frequency-domain signal and the phase $\angle X'_2(k)$ of the right channel frequency-domain signal:

$$\angle X'_1(k)=\angle M'(k) \quad (2.4)$$

$$\angle X'_2(k)=\angle M'(k)-\text{IPD}'(k) \quad (2.5)$$

$\angle M'(k)$ indicates the phase of the monophonic frequency-domain signal.

When $d_g'=0$, the phase of the left channel maintains the phase of the monophonic frequency-domain signal, while the phase of the right channel is a difference between the phase of the monophonic frequency-domain signal and IPD'(k) that is obtained through the group delay $d_g'$ and the group phase $\theta_g'$.

When $d_g'\neq 0$, the following formulas (2.6) and (2.7) are used to obtain the phase $\angle X'_1(k)$ of the left channel frequency-domain signal and the phase $\angle X'_2(k)$ of the right channel frequency-domain signal:

$$\angle X_1'(k) = \angle M'(k) + \frac{1}{1+c(b)} IPD'(k) \quad (2.6)$$

$$\angle X_2'(k) = \angle M'(k) - \frac{c(b)}{1+c(b)} IPD'(k) \quad (2.7)$$

When $d_g'\neq 4$, the phase of the left channel frequency-domain signal and the phase of the right channel frequency-domain signal are calculated by replacing the IPD with IPD'(k) that is obtained through the group delay $d_g'$ and the group phase $\theta_g'$.

Step 306: According to the energy of the left channel frequency-domain signal and the energy of the right channel frequency-domain signal, and the phase of the left channel frequency-domain signal and the phase of the right channel frequency-domain signal, obtain the left channel frequency-domain signal and the right channel frequency-domain signal.

Specifically, the following formulas (2.8) and (2.9) are used to obtain the left channel frequency-domain signal $X_1'(k)$ and the right channel frequency-domain signal $X_2'(k)$:

$$X_1'(k)=|X_1'(k)|*e^{j\angle X1'(k)} \quad (2.8)$$

$$X_2'(k)=|X_2'(k)|*e^{j\angle X2'(k)} \quad (2.9)$$

Step 307: Obtain a left channel output signal and a right channel output signal after performing frequency-time conversion for the left channel frequency-domain signal and the right channel frequency-domain signal, respectively.

The stereo decoding method provided in the embodiment is applicable to a communication scenario with a low code rate. The received code stream includes an encoded monophonic signal, and at least includes an encoded ILD, group delay, and group phase. The group delay and the group phase occupy a few bandwidth resources without affecting the code rate. According to the stereo decoding method provided in the embodiment, the energy of the left channel signal and the energy of the right channel signal are obtained by processing the energy of the monophonic frequency-domain signal according to the ILD; when the group delay is 0, the phase of the left channel signal and the phase of the right channel signal are obtained by processing the phase of the monophonic frequency-domain signal according to the IPD estimate value obtained through the group delay and the group phase; when the group delay is not 0, the phase of the left channel signal and the phase of the right channel signal are obtained by processing the phase of the monophonic frequency-domain signal according to the ILD and the IPD estimate value that is obtained through the group delay and the group phase; so that the obtained signal contains not only energy value information between two channels of signals but also contains time delay information and waveform similarity information between two channels of signals, thereby yielding favorable stereo sound field effect for the obtained left channel signal and right channel signal.

The embodiment of the present invention may be applicable to communication scenarios with medium and high code rates. Specifically, on the basis of the first embodiment, step 101 further includes restoring a differential value of an IPD from the received code stream through decoding, and step 102 may be specifically: processing the monophonic signal according to the ILD, the differential value of the IPD, the group delay, and the group phase to obtain a first channel signal and a second channel signal.

Specifically, step 103 may include: obtaining a monophonic frequency-domain signal after performing time-frequency conversion on the monophonic signal; obtaining an IPD estimate value according to the group delay and the group phase; obtaining an IPD according to the IPD estimate value and the differential value of the IPD; processing the monophonic frequency-domain signal according to the ILD and the IPD to obtain a first channel frequency-domain signal and a second channel frequency-domain signal; obtaining a first channel signal and a second channel signal after performing frequency-time conversion for the first channel frequency-domain signal and the second channel frequency-domain signal, respectively. The following further describes the technical solution through fourth and fifth embodiments.

Figure 4A:
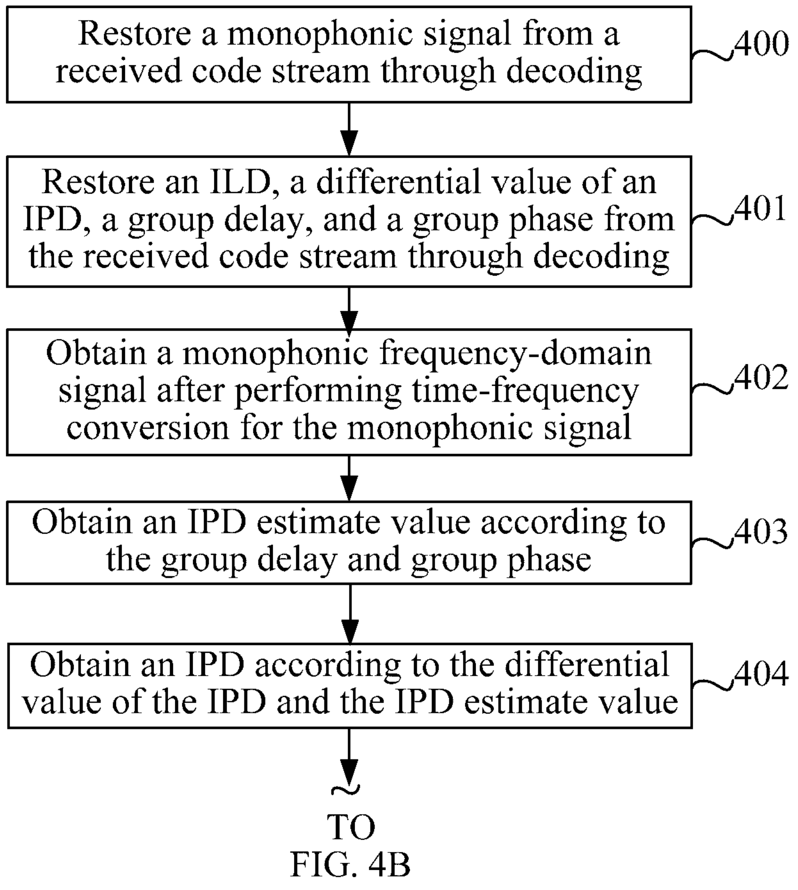
FIGS. 4*a* and 4*b* are flowcharts of a stereo decoding method provided in a fourth embodiment of the present invention.
Figure 4B:
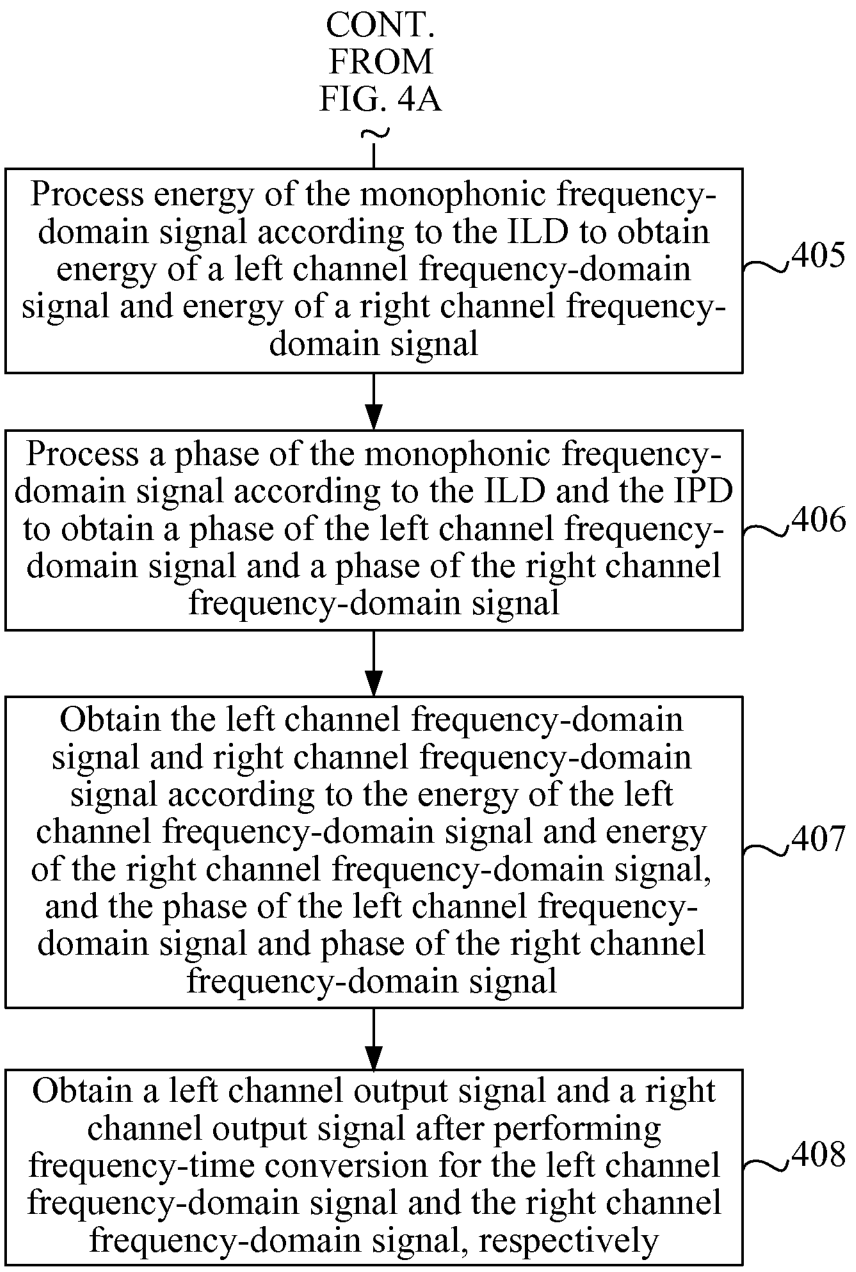

FIG. 4 is a flowchart of a stereo decoding method provided in a fourth embodiment of the present invention. In the embodiment, a first channel is a left channel, and a second channel is a right channel. As shown in FIG. 4, this embodiment includes the following steps:

Step 400: Restore a monophonic signal from a received code stream through decoding.

Specifically, a monophonic bit signal is extracted from the code stream, and is decoded by a monophonic signal (Mono) decoder to restore the monophonic signal. The monophonic signal is also called a down-mixed signal.

Step 401: Restore an ILD, a differential value of an IPD, a group delay, and a group phase from the received code stream through decoding.

The group delay is expressed as $d_g'$ and the group phase is expressed as $\theta_g'$.

Step 402: Obtain a monophonic frequency-domain signal after performing time-frequency conversion for the monophonic signal.

Time-frequency conversion is performed for the monophonic signal to obtain the monophonic frequency-domain signal. The monophonic frequency-domain signal is expressed as M'(k).

Step 403: Obtain an IPD estimate value according to the group delay and group phase.

The group delay $d_g'$ and the group phase $\theta_g'$ are restored from the code stream through decoding. The IPD estimate value is obtained by using the formula (3.1):

$$\overline{IPD'(k)} = \frac{-2\pi d_g' * k}{N} + \theta_g' \quad (3.1)$$

The frequency-domain signal is divided into a plurality of frequency bands. It is assumed that the frequency-domain signal is divided into M frequency bands, k indicates a frequency point index, b indicates a frequency band index, and N indicates a length of time-frequency conversion, where k=0, . . . , N−1, b=0, . . . , M−1. In formula (3.1), $\overline{IPD'(k)}$ indicates the IPD estimate value of a frequency point whose index is k.

Step 404: Obtain an IPD according to the differential value of the IPD and the IPD estimate value.

The differential value $IPD_{diff}'(k)$ of the IPD is restored from the code stream through decoding. The IPD, expressed by IPD'(k), is obtained by adding $IPD_{diff}'(k)$ and the IPD estimate value $\overline{IPD'(k)}$, as shown in the formula (3.2):

$$IPD'(k)=IPD_{diff}'(k)+\overline{IPD'(k)} \tag{3.2}$$

Step 405: Process energy of the monophonic frequency-domain signal according to the ILD to obtain energy of a left channel frequency-domain signal and energy of a right channel frequency-domain signal.

Specifically, the following formulas (3.3) and (3.4) are used to obtain the energy $|X'_1(k)|$ of the left channel frequency-domain signal and the energy $|X'_2(k)|$ of the right channel frequency-domain signal:

$$|X_1'(k)|=|M'(k)|*\frac{c(b)}{1+c(b)} \tag{3.3}$$

$$|X_2'(k)|=|M'(k)|*\frac{1}{1+c(b)} \tag{3.4}$$

$c(b)=10^{ILD'(b)/10}$, ILD'(b) indicates the ILD of a frequency band whose index is b, and |M'(k)| indicates the energy of the monophonic frequency-domain signal.

Step 406: Process a phase of the monophonic frequency-domain signal according to the ILD and the IPD to obtain a phase of the left channel frequency-domain signal and a phase of the right channel frequency-domain signal.

Specifically, the following formulas (3.5) and (3.6) are used to obtain the phase $\angle X'_1(k)$ of the left channel frequency-domain signal and the phase $\angle X'_2(k)$ of the right channel frequency-domain signal:

$$\angle X_1'(k)=\angle M'(k)+\frac{1}{1+c(b)}IPD'(k) \tag{3.5}$$

$$\angle X_2'(k)=\angle M'(k)-\frac{c(b)}{1+c(b)}IPD'(k) \tag{3.6}$$

$\angle M'(k)$ indicates the phase of the monophonic frequency-domain signal.

In the step, the phase of the left channel frequency-domain signal and the phase of the right channel frequency-domain signal are calculated out by using the IPD that is obtained through the differential value of the IPD and the IPD estimate value.

Step 407: According to the energy of the left channel frequency-domain signal and the energy of the right channel frequency-domain signal, and the phase of the left channel frequency-domain signal and the phase of the right channel frequency-domain signal, obtain the left channel frequency-domain signal and the right channel frequency-domain signal.

Specifically, the following formulas (3.7) and (3.8) are used to obtain the left channel frequency-domain signal $X_1'(k)$ and the right channel frequency-domain signal $X_2'(k)$:

$$X_1'(k)=|X_1'(k)|*e^{j\angle X1'(k)} \tag{3.7}$$

$$X_2'(k)=|X_2'(k)|*e^{j\angle X2'(k)} \tag{3.8}$$

Step 408: Obtain a left channel output signal and a right channel output signal after performing frequency-time conversion for the left channel frequency-domain signal and the right channel frequency-domain signal, respectively.

The stereo decoding method provided in the embodiment is applicable to communication scenarios with medium and high code rates. The received code stream includes an encoded monophonic signal, and includes an encoded ILD, an encoded differential value of the IPD, an encoded group delay, and an encoded group phase. The group delay and group phase occupy a few bandwidth resources without affecting the code rates. According to the stereo decoding method provided in the embodiment, the energy of the left channel signal and the energy of the right channel signal are obtained by processing the energy of the monophonic frequency-domain signal according to the ILD; the phase of the left channel frequency-domain signal and the phase of the right channel frequency-domain signal are calculated out by using the IPD, where the IPD is obtained from the differential value of the IPD and the IPD estimate value that is obtained through the group delay and group phase; so that the obtained signal contains not only energy value information between two channels of signals but also contains time delay information and waveform similarity information between two channels of signals, thereby yielding favorable stereo sound field effect for the obtained left channel signal and right channel signal.

Figure 5A:
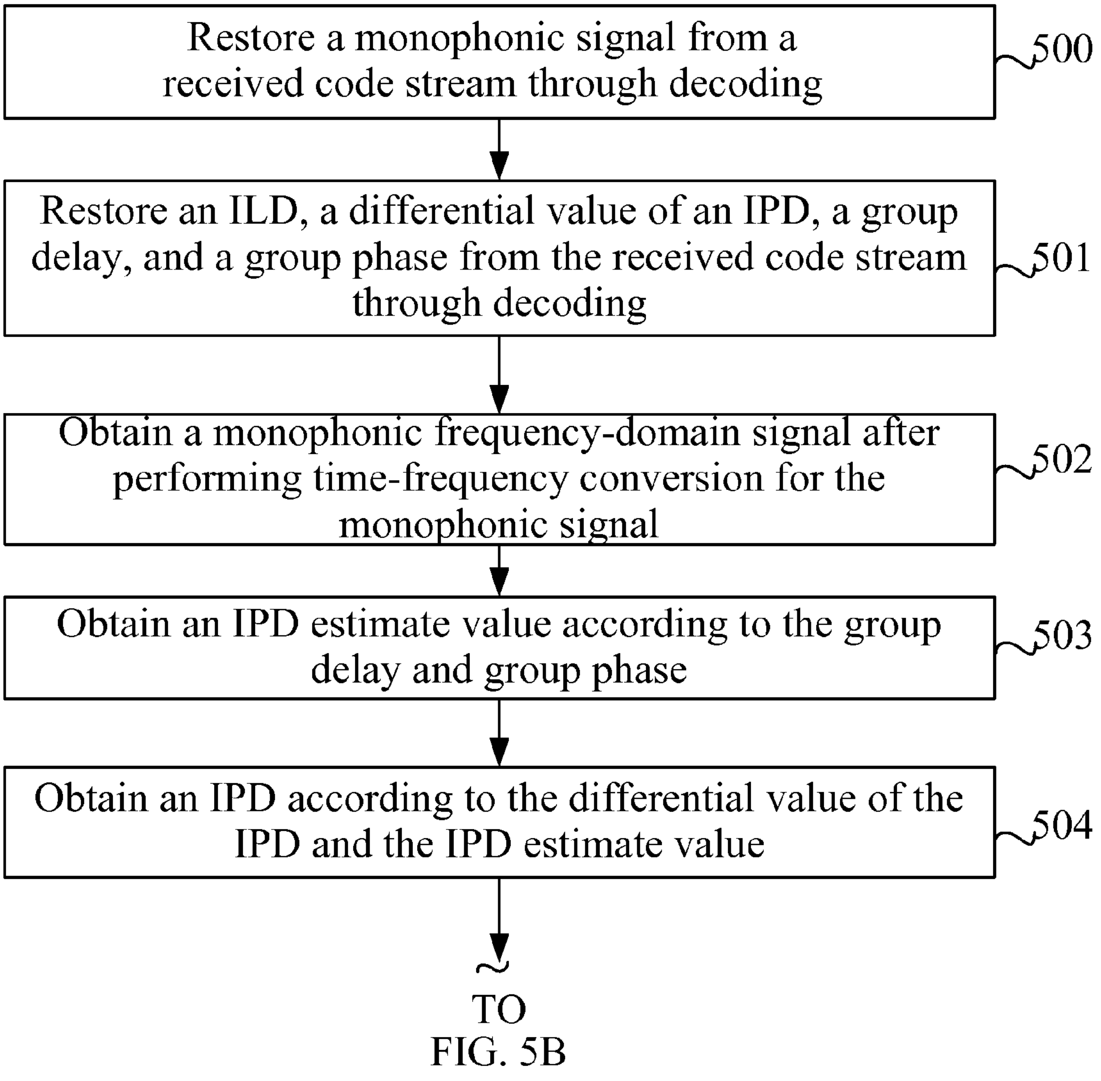
FIGS. 5*a* and 5*b* are flowcharts of a stereo decoding method provided in a fifth embodiment of the present invention.
Figure 5B:
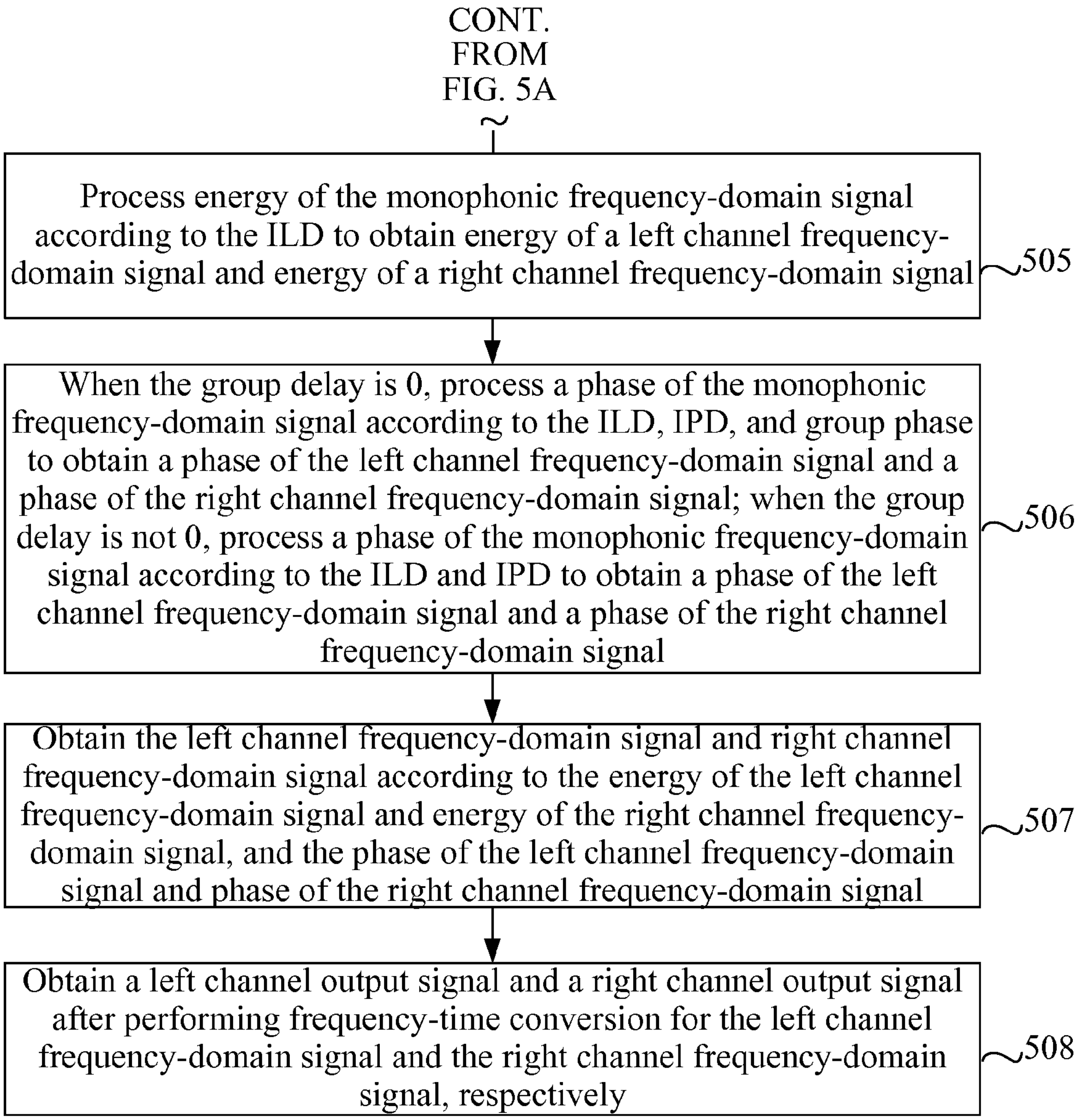

FIG. 5 is a flowchart of a stereo decoding method provided in a fifth embodiment of the present invention. In the embodiment, a first channel is a left channel, and a second channel is a right channel. As shown in FIG. 5, the embodiment includes the following steps:

Step 500: Restore a monophonic signal from a received code stream through decoding.

Specifically, a monophonic bit signal is extracted from the code stream, and is decoded by a monophonic signal (Mono) decoder to restore the monophonic signal. The monophonic signal is also called a down-mixed signal.

Step 501: Restore an ILD, a differential value of an IPD, a group delay, and a group phase from the received code stream through decoding.

The group delay is expressed as $d_g'$ and the group phase is expressed as $\theta_g'$.

Step 502: Obtain a monophonic frequency-domain signal after performing time-frequency conversion for the monophonic signal.

Time-frequency conversion is performed for the monophonic signal to obtain the monophonic frequency-domain signal. The monophonic frequency-domain signal is expressed as M'(k).

Step 503: Obtain an IPD estimate value according to the group delay and group phase.

The group delay $d_g'$ and the group phase $\theta_g'$ are restored from the code stream through decoding. The IPD estimate value is obtained by using the formula (4.1):

$$\overline{IPD'(k)}=\frac{-2\pi d_g'*k}{N}+\theta_g' \tag{4.1}$$

The frequency-domain signal is divided into a plurality of frequency bands. It is assumed that the frequency-domain signal is divided into M frequency bands, k indicates a frequency point index, b indicates a frequency band index, and N indicates a length of time-frequency conversion, where k=0, . . . , N−1, b=0, . . . , M−1. In formula (4.1), $\overline{IPD'(k)}$ indicates the IPD estimate value of a frequency point whose index is k.

Step 504: Obtain an IPD according to the differential value of the IPD and the IPD estimate value.

The differential value $IPD_{diff}'(k)$ of the IPD is restored from the code stream through decoding. The IPD, expressed by $IPD_{diff}'(k)$, is obtained by adding $\overline{IPD'(k)}$ and the IPD estimate value IPD'(k), as shown in the formula (4.2):

$$IPD'(k)=IPD_{diff}'(k)+\overline{IPD'(k)} \quad (4.2)$$

Step 505: Process energy of the monophonic frequency-domain signal according to the ILD to obtain energy of a left channel frequency-domain signal and energy of a right channel frequency-domain signal.

Specifically, the following formulas (4.3) and (4.4) are used to obtain the energy $|X'_1(k)|$ of the left channel frequency-domain signal and the energy $|X'_2(k)|$ of the right channel frequency-domain signal:

$$|X_1'(k)| = |M'(k)| * \frac{c(b)}{1+c(b)} \quad (4.3)$$

$$|X_2'(k)| = |M'(k)| * \frac{1}{1+c(b)} \quad (4.4)$$

$c(b)=10^{ILD'(b)/10}$, ILD'(b) indicates the ILD of a frequency band whose index is b, and |M'(k)| indicates the energy of the monophonic frequency-domain signal.

Step 506: When the group delay is 0, process a phase of the monophonic frequency-domain signal according to the ILD, IPD, and group phase to obtain a phase of the left channel frequency-domain signal and a phase of the right channel frequency-domain signal; when the group delay is not 0, process a phase of the monophonic frequency-domain signal according to the ILD and IPD to obtain a phase of the left channel frequency-domain signal and a phase of the right channel frequency-domain signal.

Specifically, when $d_g'=0$, the following formulas (4.5) and (4.6) are used to obtain the phase $\angle X'_1(k)$ of the left channel frequency-domain signal and the phase $\angle X'_2(k)$ of the right channel frequency-domain signal:

$$\angle X_1'(k) = \angle M'(k) + \frac{1}{1+c(b)}(IPD'(k) - \theta_g') \quad (4.5)$$

$$\angle X_2'(k) = \angle M'(k) + \frac{1}{1+c(b)}(IPD'(k) - \theta_g') - IPD'(k) \quad (4.6)$$

$\angle M'(k)$ indicates the phase of the monophonic frequency-domain signal. The value range of $IPD'(k)-\theta'_g$ is $(-\pi,\pi]$.

When $d_g'\neq 4$, the following formulas (4.7) and (4.8) are used to obtain the phase $\angle X'_1(k)$ of the left channel frequency-domain signal and the phase $\angle X'_2(k)$ of the right channel frequency-domain signal:

$$\angle X_1'(k) = \angle M'(k) + \frac{1}{1+c(b)} IPD'(k) \quad (4.7)$$

-continued $$\angle X_2'(k) = \angle M'(k) - \frac{c(b)}{1+c(b)} IPD'(k) \quad (4.8)$$

When $d_g'\neq 4$, the phase of the left channel frequency-domain signal and the phase of the right channel frequency-domain signal are calculated out by using the IPD that is obtained through the differential value of the IPD and the IPD estimate value.

Step 507: According to the energy of the left channel frequency-domain signal and the energy of the right channel frequency-domain signal, and the phase of the left channel frequency-domain signal and the phase of the right channel frequency-domain signal, obtain the left channel frequency-domain signal and the right channel frequency-domain signal.

Specifically, the following formulas (4.9) and (4.10) are used to obtain the left channel frequency-domain signal $X_1'(k)$ and the right channel frequency-domain signal $X_2'(k)$:

$$X_1'(k)=|X_1'(k)|*e^{j\angle X_1'(k)} \quad (4.9)$$

$$X_2'(k)=|X_2'(k)|*e^{j\angle X_2'(k)} \quad (4.10)$$

Step 508: Obtain a left channel output signal and a right channel output signal after performing frequency-time conversion for the left channel frequency-domain signal and the right channel frequency-domain signal, respectively.

The stereo decoding method provided in the embodiment is applicable to communication scenarios with medium and high code rates. The received code stream includes an encoded monophonic signal, and includes an encoded ILD, an encoded differential value of the IPD, an encoded group delay, and an encoded group phase. The group delay and the group phase occupy a few bandwidth resources without affecting the code rates. According to the stereo decoding method provided in the embodiment, the energy of the left channel signal and the energy of the right channel signal are obtained by processing the energy of the monophonic frequency-domain signal according to the ILD; when the group delay is 0, the phase of the left channel frequency-domain signal and the phase of the right channel frequency-domain signal are calculated out according to the ILD, IPD, and group phase; when the group delay is not 0, the phase of the left channel frequency-domain signal and the phase of the right channel frequency-domain signal are calculated out according to the ILD and IPD, where the IPD is obtained according to the differential value of the IPD and the IPD estimate value that is obtained through the group delay and group phase; so that the obtained signal contains not only energy value information between two channels of signals but also contains time delay information and waveform similarity information between two channels of signals, thereby yielding favorable stereo sound field effect for the obtained left channel signal and right channel signal.

Figure 6:
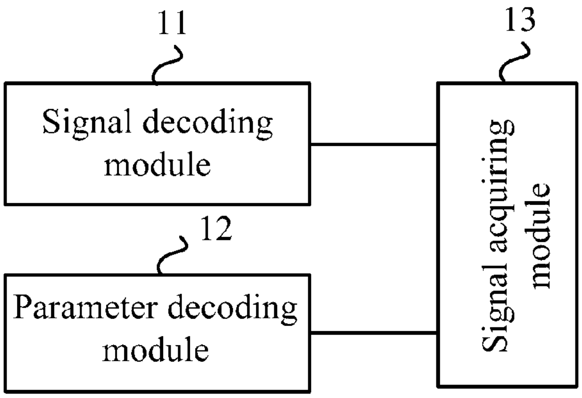
FIG. 6 is a schematic structural diagram of a stereo decoding apparatus provided in a sixth embodiment of the present invention.

FIG. 6 is a schematic structural diagram of a stereo decoding apparatus provided in a sixth embodiment of the present invention. As shown in FIG. 6, the embodiment specifically includes: a signal decoding module 11, a parameter decoding module 12, and a signal acquiring module 13, where the signal decoding module 11 is configured to restore a monophonic signal from a received code stream through decoding;

the parameter decoding module 12 is configured to restore an ILD, a group delay, and a group phase from the received code stream through decoding; and the signal acquiring module 13 is configured to process the monophonic signal according to the ILD, group delay, and group phase to obtain a first channel signal and a second channel signal.

Specifically, the signal decoding module 11 extracts a monophonic bit signal from the code stream, and restores the monophonic signal by decoding the monophonic bit signal; the parameter decoding module 12 restores the ILD, group delay, and group phase from the code stream through decoding; the signal acquiring module 13 processes the monophonic signal according to the ILD, group delay, and group phase to obtain the first channel signal and second channel signal.

The stereo decoding apparatus provided in the embodiment is applicable to a communication scenario with a low code rate. The received code stream includes an encoded monophonic signal, and includes an encoded ILD, an encoded group delay, and an encoded group phase. The group delay and group phase occupy a few bandwidth resources without affecting the code rate. According to the stereo decoding apparatus provided in the embodiment, the first channel signal and second channel signal are obtained according to the monophonic signal, ILD, group delay, and group phase, so that the obtained signal contains energy value information between two channels of signals by referring to the ILD, and the obtained signal contains time delay information and waveform similarity information between two channels of signals by referring to the group delay and group phase, thereby yielding favorable stereo sound field effect for the obtained first channel signal and second channel signal.

Figure 7:
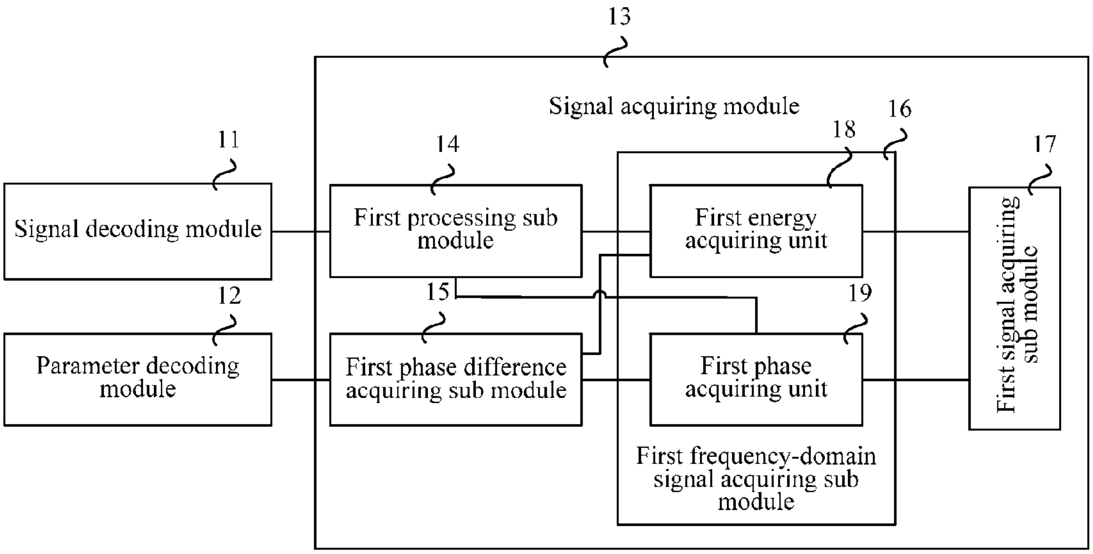
FIG. 7 is a schematic structural diagram of a stereo decoding apparatus provided in a seventh embodiment of the present invention.

FIG. 7 is a schematic structural diagram of a stereo decoding apparatus provided in a seventh embodiment of the present invention. As shown in FIG. 7, on the basis of the sixth embodiment, in this embodiment, the signal acquiring module 13 further includes: a first processing sub module 14, a first phase difference acquiring sub module 15, a first frequency-domain signal acquiring sub module 16, and a first signal acquiring sub module 17, where:

the first processing sub module 14 is configured to obtain a monophonic frequency-domain signal after performing time-frequency conversion for the monophonic signal;

the first phase difference acquiring sub module 15 is configured to obtain an IPD estimate value according to the group delay and group phase;

the first frequency-domain signal acquiring sub module 16 is configured to process the monophonic frequency-domain signal according to the ILD and the IPD estimate value to obtain a first channel frequency-domain signal and second channel frequency-domain signal; and the first signal acquiring sub module 17 is configured to obtain the first channel signal and the second channel signal after performing frequency-time conversion for the first channel frequency-domain signal and the second channel frequency-domain signal, respectively.

Specifically, the first processing sub module 14 obtains the monophonic frequency-domain signal after performing time-frequency conversion for the monophonic signal; the first phase difference acquiring sub module 15 may estimate the IPD estimate value according to the formula (1.1); the first frequency-domain signal acquiring sub module 16 processes the monophonic frequency-domain signal according to the ILD and the IPD estimate value to obtain the first channel frequency-domain signal and second channel frequency-domain signal; the first signal acquiring sub module 17 obtains the first channel signal and the second channel signal after performing frequency-time conversion for the first channel frequency-domain signal and the second channel frequency-domain signal, respectively.

Further, the first frequency-domain signal acquiring sub module 16 may include a first energy acquiring unit 18 and a first phase acquiring unit 19, where:

the first energy acquiring unit 18 is configured to process energy of the monophonic frequency-domain signal according to the ILD to obtain energy of the first channel frequency-domain signal and energy of the second channel frequency-domain signal; and the first phase acquiring unit 19 is configured to process a phase of the monophonic frequency-domain signal according to the ILD and the IPD estimate value to obtain a phase of the first channel frequency-domain signal and a phase of the second channel frequency-domain signal.

Specifically, the first energy acquiring unit 18 may use the preceding formulas (1.2) and (1.3) to obtain the energy $|X'_1(k)|$ of the first channel frequency-domain signal and the energy $|X'_2(k)|$ of the second channel frequency-domain signal; the first phase acquiring unit 19 may use the preceding formulas (1.4) and (1.5) to obtain the phase $\angle X'_1(k)$ of the first channel frequency-domain signal and the phase $\angle X'_2(k)$ of the second channel frequency-domain signal.

Figure 8:
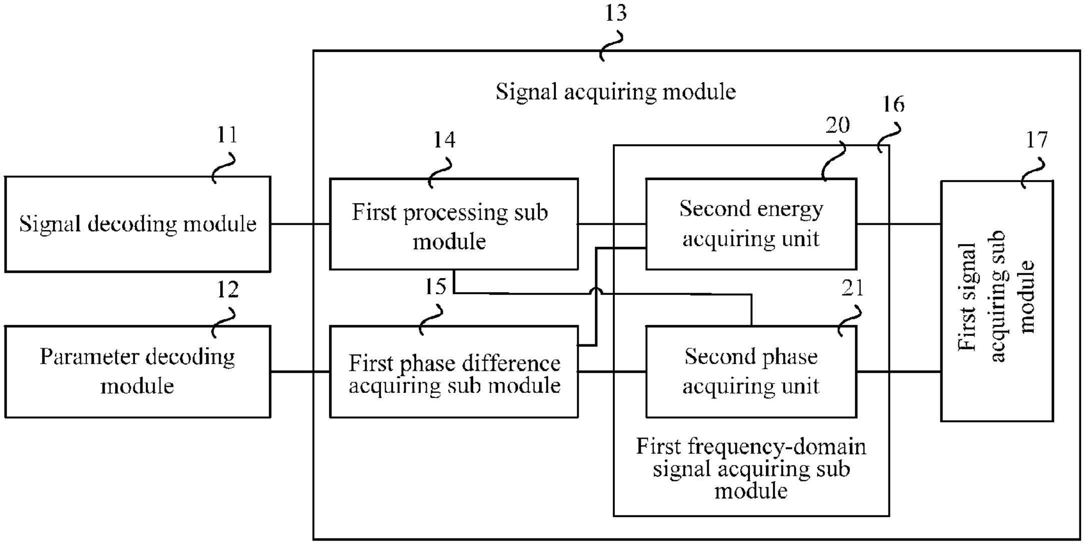
FIG. 8 is a schematic structural diagram of a stereo decoding apparatus provided in an eighth embodiment of the present invention.

FIG. 8 is a schematic structural diagram of a stereo decoding apparatus provided in an eighth embodiment of the present invention. As shown in FIG. 8, the difference between the embodiment and the seventh embodiment is that the first frequency-domain signal acquiring sub module includes a second energy acquiring unit 20 and a second phase acquiring unit 21.

The second energy acquiring unit 20 is configured to process energy of the monophonic frequency-domain signal according to the ILD to obtain energy of a first channel frequency-domain signal and energy of a second channel frequency-domain signal.

The second phase acquiring unit 21 is configured to: when the group delay is 0, process a phase of the monophonic frequency-domain signal according to the IPD estimate value to obtain a phase of the first channel frequency-domain signal and a phase of the second channel frequency-domain signal; when the group delay is not 0, process a phase of the monophonic frequency-domain signal according to the ILD and the IPD estimate value to obtain a phase of the first channel frequency-domain signal and a phase of the second channel frequency-domain signal.

Specifically, the second energy acquiring unit 20 may use the preceding formulas (2.2) and (2.3) to obtain the energy $|X'_1(k)|$ of the first channel frequency-domain signal and the energy $|X'_2(k)|$ of the second channel frequency-domain signal; the second phase acquiring unit 21 may use the preceding formulas (2.4) and (2.5) or the preceding formulas (2.6) and (2.7) to obtain the phase $\angle X'_1(k)$ of the first channel frequency-domain signal and the phase $\angle X'_2(k)$ of the second channel frequency-domain signal.

The stereo decoding apparatus shown in FIG. 7 or FIG. 8 is applicable to a communication scenario with a low code rate. The received code stream includes an encoded monophonic signal, and includes an encoded ILD, an encoded group delay, and an encoded group phase. The group delay and group phase occupy a few bandwidth resources without affecting the code rate. According to the stereo decoding apparatus shown in FIG. 7 or FIG. 8, the first channel signal and the second channel signal are obtained according to the monophonic signal, ILD, group delay, and group phase, so that the obtained signal contains energy value information between two channels of signals by referring to the ILD, and the obtained signal contains time delay information and waveform similarity information between two channels of signals by referring to the group delay and group phase, thereby yielding favorable stereo sound field effect for the obtained first channel signal and second channel signal.

Figure 9:
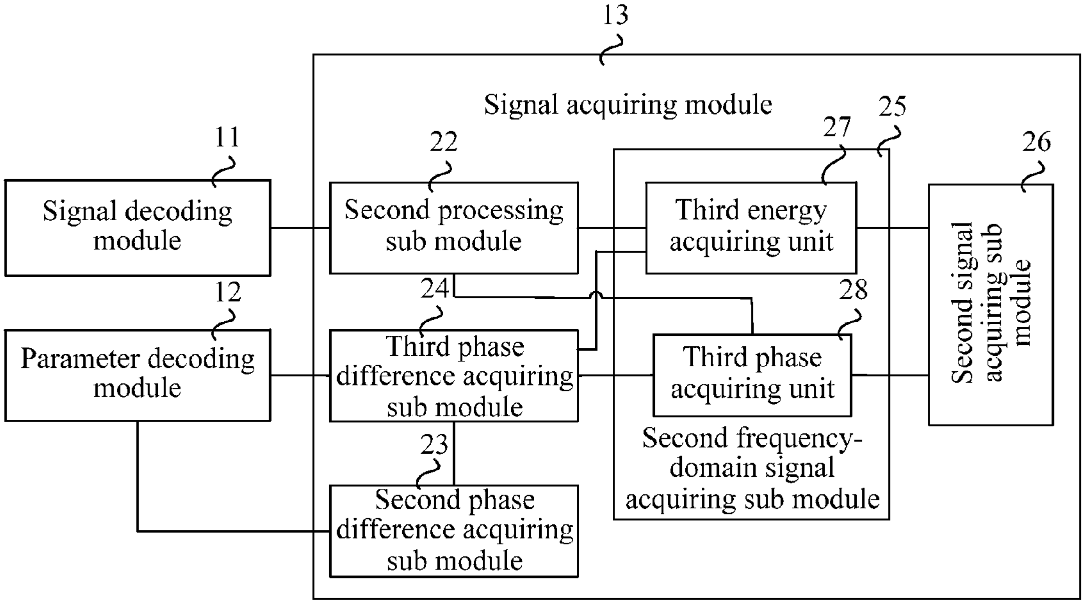
FIG. 9 is a schematic structural diagram of a stereo decoding apparatus provided in a ninth embodiment of the present invention.

FIG. 9 is a schematic structural diagram of a stereo decoding apparatus provided in a ninth embodiment of the present invention. As shown in FIG. 9, on the basis of the sixth embodiment, the parameter decoding module is further configured to restore a differential value of an IPD from the received code stream through decoding; the signal acquiring module 13 is specifically configured to process the monophonic signal according to the ILD, differential value of the IPD, group delay, and group phase to obtain a first channel signal and second channel signal.

Further, the signal acquiring module 13 may include:

a second processing sub module 22, configured to obtain a monophonic frequency-domain signal after performing time-frequency conversion for the monophonic signal;

a second phase difference acquiring sub module 23, configured to obtain an IPD estimate value according to the group delay and group phase;

a third phase difference acquiring sub module 24, configured to obtain an IPD according to the IPD estimate value and the differential value of the IPD;

a second frequency-domain signal acquiring sub module 25, configured to process the monophonic frequency-domain signal according to the ILD and IPD to obtain a first channel frequency-domain signal and second channel frequency-domain signal; and a second signal acquiring sub module 26, configured to obtain a first channel signal and second channel signal after performing frequency-time conversion for the first channel frequency-domain signal and second channel frequency-domain signal, respectively.

Specifically, the second processing sub module 22 obtains the monophonic frequency-domain signal after performing time-frequency conversion for the monophonic signal; the second phase difference acquiring sub module 23 may estimate the IPD estimate value according to the formula (3.1); the third phase difference acquiring sub module 24 may obtain the IPD by adding the differential value $IPD_{diff}'(k)$ of the IPD and the IPD estimate value $\overline{IPD'(k)}$; the second frequency-domain signal acquiring sub module 25 process the monophonic frequency-domain signal according to the ILD and the IPD to obtain the first channel frequency-domain signal and second channel frequency-domain signal; the second signal acquiring sub module 26 obtains the first channel signal and the second channel signal after performing frequency-time conversion for the first channel frequency-domain signal and the second channel frequency-domain signal, respectively.

Further, the second frequency-domain signal acquiring sub module 25 may include a third energy acquiring unit 27 and a third phase acquiring unit 28, where:

the third energy acquiring unit 27 is configured to process energy of the monophonic frequency-domain signal according to the ILD to obtain energy of the first channel frequency-domain signal and energy of the second channel frequency-domain signal; and the third phase acquiring unit 28 is configured to process a phase of the monophonic frequency-domain signal according to the ILD and IPD to obtain a phase of the first channel frequency-domain signal and a phase of the second channel frequency-domain signal.

Specifically, the third energy acquiring unit 27 may use the preceding formulas (3.3) and (3.4) to obtain the energy $|X'_1(k)|$ of the first channel frequency-domain signal and the energy $|X'_2(k)|$ of the second channel frequency-domain signal; the third phase acquiring unit 28 may use the preceding formulas (3.5) and (3.6) to obtain the phase $\angle X'_1(k)$ of the left channel frequency-domain signal and the phase $\angle X'_2(k)$ of the right channel frequency-domain signal.

Figure 10:
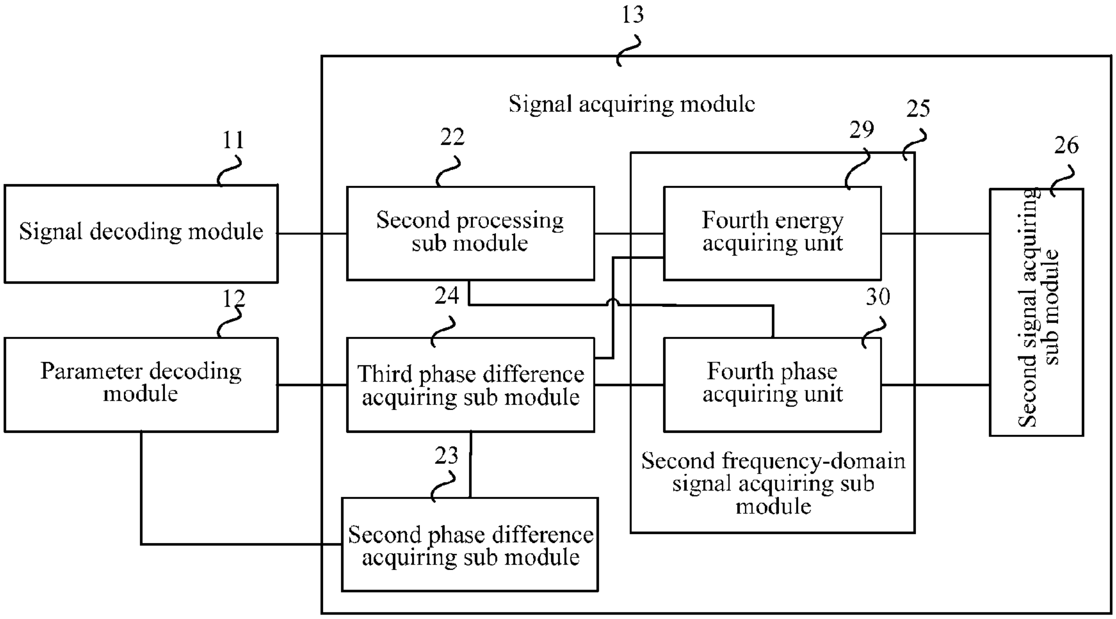
FIG. 10 is a schematic structural diagram of a stereo decoding apparatus provided in a tenth embodiment of the present invention.

FIG. 10 is a schematic structural diagram of a stereo decoding apparatus provided in a tenth embodiment of the present invention. As shown in FIG. 10, the difference between the embodiment and the ninth embodiment is that the second frequency-domain signal acquiring sub module 25 includes a fourth energy acquiring unit 29 and a fourth phase acquiring unit 30, where:

the fourth energy acquiring unit 29 is configured to process energy of the monophonic frequency-domain signal according to the ILD to obtain energy of a first channel frequency-domain signal and energy of a second channel frequency-domain signal; and the fourth phase acquiring unit 30 is configured to: when the group delay is 0, process a phase of the monophonic frequency-domain signal according to the ILD, IPD, and group phase to obtain a phase of the first channel frequency-domain signal and a phase of the second channel frequency-domain signal; when the group delay is not 0, process a phase of the monophonic frequency-domain signal according to the ILD and IPD to obtain a phase of the first channel frequency-domain signal and a phase of the second channel frequency-domain signal.

Specifically, the fourth energy acquiring unit 29 may use the preceding formulas (4.3) and (4.4) to obtain the energy $|X'_1(k)|$ of the first channel frequency-domain signal and the energy $|X'_2(k)|$ of the second channel frequency-domain signal; the fourth phase acquiring unit 30 may use the preceding formulas (4.5) and (4.6) or the preceding formulas (4.7) and (4.8) to obtain the phase $\angle X'_1(k)$ of the first channel frequency-domain signal and the phase $\angle X'_2(k)$ of the second channel frequency-domain signal.

The stereo decoding apparatus shown in FIG. 9 or FIG. 10 is applicable to communication scenarios with medium and high code rates. The received code stream includes an encoded monophonic signal, and includes an encoded ILD, an encoded differential value of the IPD, an encoded group delay, and an encoded group phase. The group delay and group phase occupy a few bandwidth resources without affecting the code rates. According to the stereo decoding apparatus shown in FIG. 9 or FIG. 10, a left channel signal and a right channel signal are obtained according to the monophonic signal, ILD, differential value of the IPD, group delay, and group phase, so that the obtained signal contains energy value information between two channels of signals by referring to the ILD, and the obtained signal contains time delay information and waveform similarity information between two channels of signals by referring to the group delay and group phase, thereby yielding favorable stereo sound field effect for the obtained left channel signal and right channel signal.

Those killed in the art can understand that all or part of the processes in the preceding method according to the embodiments may be implemented by using a computer program instructing relevant hardware. The program can be stored in a storage medium that can be read by a computer. When the program runs, the processes of each method embodiment in the above description may be included. The storage medium may be magnetic disk, compact disk, Read-Only Memory (ROM), or Random Access Memory (RAM).

Only several embodiments of the present invention are described above. Those skilled in the art can make various modifications and variations to the present invention on the basis of the disclosed content of the application above without departing from the spirit and scope of the present invention. Those skilled in the art can understand that the preceding embodiments or the features of different embodiments can combine to form new embodiments without conflicts.

The invention claimed is:

1. A stereo decoding method, comprising:

restoring a monophonic signal from a received code stream through decoding;

restoring an interchannel level difference, a group delay, and a group phase from the received code stream through decoding; and processing the monophonic signal according to the interchannel level difference, group delay, and group phase to obtain a first channel signal and a second channel signal, wherein processing the monophonic signal according to the interchannel level difference, group delay, and group phase to obtain the first channel signal and the second channel signal comprises:

performing time-frequency conversion for the monophonic signal to obtain a monophonic frequency-domain signal;

obtaining an interchannel phase difference estimate value according to the group delay and group phase;

processing the monophonic frequency-domain signal according to the interchannel level difference and interchannel phase difference estimate value to obtain a first channel frequency-domain signal and a second channel frequency-domain signal; and obtaining the first channel signal and the second channel signal after performing frequency-time conversion for the first channel frequency-domain signal and the second channel frequency-domain signal, respectively;

wherein the interchannel phase difference estimate value is obtained according to the group delay and group phase by the following equation:

$$IPD'(k) = \frac{-2\pi d_g' * k}{N} + \theta_g';$$

wherein k indicates a frequency point index, $d_g'$ indicates the group delay, $\theta_g'$ indicates the group phase, N indicates a length of time-frequency conversion.

2. The stereo decoding method according to claim 1, wherein processing the monophonic frequency-domain signal according to the interchannel level difference and interchannel phase difference estimate value to obtain the first channel frequency-domain signal and second channel frequency-domain signal comprises:

processing energy of the monophonic frequency-domain signal according to the interchannel level difference to obtain energy of the first channel frequency-domain signal and energy of the second channel frequency-domain signal; and processing a phase of the monophonic frequency-domain signal according to the interchannel level difference and interchannel phase difference estimate value to obtain a phase of the first channel frequency-domain signal and a phase of the second channel frequency-domain signal.

3. The stereo decoding method according to claim 1, wherein processing the monophonic frequency-domain signal according to the interchannel level difference and interchannel phase difference estimate value to obtain the first channel frequency-domain signal and second channel frequency-domain signal comprises:

processing energy of the monophonic frequency-domain signal according to the interchannel level difference to obtain energy of the first channel frequency-domain signal and energy of the second channel frequency-domain signal;

when the group delay is 0, processing a phase of the monophonic frequency-domain signal according to the interchannel phase difference estimate value to obtain a phase of the first channel frequency-domain signal and a phase of the second channel frequency-domain signal; and when the group delay is not 0, processing a phase of the monophonic frequency-domain signal according to the interchannel level difference and interchannel phase difference estimate value to obtain a phase of the first channel frequency-domain signal and a phase of the second channel frequency-domain signal.

4. The stereo decoding method according to claim 1, further comprising:

restoring a differential value of an interchannel phase difference from the received code stream through decoding; and wherein processing the monophonic signal according to the interchannel level difference, group delay, and group phase to obtain the first channel signal and second channel signal comprises processing the monophonic signal according to the interchannel level difference, the differential value of the interchannel phase difference, group delay, and group phase to obtain the first channel signal and second channel signal.

5. The stereo decoding method according to claim 4, wherein processing the monophonic signal according to the interchannel level difference, the differential value of the interchannel phase difference, group delay, and group phase to obtain the first channel signal and second channel signal comprises:

performing time-frequency conversion for the monophonic signal to obtain a monophonic frequency-domain signal;

obtaining an interchannel phase difference estimate value according to the group delay and group phase;

obtaining an interchannel phase difference according to the interchannel phase difference estimate value and the differential value of the interchannel phase difference;

processing the monophonic frequency-domain signal according to the interchannel level difference and interchannel phase difference to obtain a first channel frequency-domain signal and a second channel frequency-domain signal; and obtaining the first channel signal and the second channel signal after performing frequency-time conversion for the first channel frequency-domain signal and the second channel frequency-domain signal, respectively.

6. The stereo decoding method according to claim 5, wherein processing the monophonic frequency-domain signal according to the interchannel level difference and interchannel phase difference to obtain the first channel frequency-domain signal and second channel frequency-domain signal comprises:

processing energy of the monophonic frequency-domain signal according to the interchannel level difference to obtain energy of the first channel frequency-domain signal and energy of the second channel frequency-domain signal; and processing a phase of the monophonic frequency-domain signal according to the interchannel level difference and interchannel phase difference to obtain a phase of the first channel frequency-domain signal and a phase of the second channel frequency-domain signal.

7. The stereo decoding method according to claim 5, wherein processing the monophonic frequency-domain signal according to the interchannel level difference and interchannel phase difference to obtain the first channel frequency-domain signal and second channel frequency-domain signal comprises:

processing energy of the monophonic frequency-domain signal according to the interchannel level difference to obtain energy of the first channel frequency-domain signal and energy of the second channel frequency-domain signal;

when the group delay is 0, processing a phase of the monophonic frequency-domain signal according to the interchannel level difference, interchannel phase difference, and group delay to obtain a phase of the first channel frequency-domain signal and a phase of the second channel frequency-domain signal; and when the group delay is not 0, processing a phase of the monophonic frequency-domain signal according to the interchannel level difference and interchannel phase difference to obtain a phase of the first channel frequency-domain signal and a phase of the second channel frequency-domain signal.

8. A stereo decoding apparatus, comprising: a non-transitory memory storing a computer program such that when the computer program is executed by computer hardware, the computer program instructs the computer hardware to perform the steps of:

restoring a monophonic signal from a received code stream through decoding;

restoring an interchannel level difference, a group delay, and a group phase from the received code stream through decoding; and processing the monophonic signal according to the interchannel level difference, group delay, and group phase to obtain a first channel signal and second channel signal, wherein processing the monophonic signal according to the interchannel level difference, group delay, and group phase to obtain the first channel signal and the second channel signal comprises:

performing time-frequency conversion for the monophonic signal to obtain a monophonic frequency-domain signal;

obtaining an interchannel phase difference estimate value according to the group delay and group phase;

processing the monophonic frequency-domain signal according to the interchannel level difference and interchannel phase difference estimate value to obtain a first channel frequency-domain signal and a second channel frequency-domain signal; and obtaining the first channel signal and the second channel signal after performing frequency-time conversion for the first channel frequency-domain signal and the second channel frequency-domain signal, respectively;

wherein the interchannel phase difference estimate value is obtained according to the group delay and group phase by the following equation:

$$IPD'(k) = \frac{-2\pi d'_g * k}{N} + \theta'_g;$$

wherein k indicates a frequency point index, $d_g'$ indicates the group delay, $\theta_g'$ indicates the group phase, N indicates a length of time-frequency conversion.

9. The stereo decoding apparatus according to claim 8, wherein processing the monophonic frequency-domain signal according to the interchannel level difference and the interchannel phase difference estimate value to obtain the first channel frequency-domain signal and the second channel frequency-domain signal comprises:

processing energy of the monophonic frequency-domain signal according to the interchannel level difference to obtain energy of the first channel frequency-domain signal and energy of the second channel frequency-domain signal; and processing a phase of the monophonic frequency-domain signal according to the interchannel level difference and interchannel phase difference estimate value to obtain a phase of the first channel frequency-domain signal and a phase of the second channel frequency-domain signal.

10. The stereo decoding apparatus according to claim 8, wherein processing the monophonic frequency-domain signal according to the interchannel level difference and the interchannel phase difference estimate value to obtain the first channel frequency-domain signal and the second channel frequency-domain signal comprises:

processing energy of the monophonic frequency-domain signal according to the interchannel level difference to obtain energy of the first channel frequency-domain signal and energy of the second channel frequency-domain signal;

when the group delay is 0, processing a phase of the monophonic frequency-domain signal according to the interchannel phase difference estimate value to obtain a phase of the first channel frequency-domain signal and a phase of the second channel frequency-domain signal; and when the group delay is not 0, processing a phase of the monophonic frequency-domain signal according to the interchannel level difference and interchannel phase difference estimate value to obtain a phase of the first channel frequency-domain signal and a phase of the second channel frequency-domain signal.

11. The stereo decoding apparatus according to claim 8, wherein restoring the interchannel level difference, the group delay, and the group phase from the received code stream through decoding comprises: restoring an differential value of an interchannel phase difference from the received code stream through decoding; and wherein processing the monophonic signal according to the interchannel level difference, the group delay, and the group phase to obtain the first channel signal and the second channel signal comprises: processing the monophonic signal according to the interchannel level difference, differential value of the interchannel phase difference, the group delay, and the group phase to obtain the first channel signal and the second channel signal.

12. The stereo decoding apparatus according to claim 11, wherein processing the monophonic signal according to the interchannel level difference, the group delay, and the group phase to obtain the first channel signal and the second channel signal comprises:

obtaining a monophonic frequency-domain signal after performing time-frequency conversion for the monophonic signal;

obtaining an interchannel phase difference estimate value according to the group delay and group phase;

obtaining an interchannel phase difference according to the interchannel phase difference estimate value and the differential value of the interchannel phase difference;

processing the monophonic frequency-domain signal according to the interchannel level difference and interchannel phase difference to obtain a first channel frequency-domain signal and second channel frequency-domain signal; and obtaining the first channel signal and the second channel signal after performing frequency-time conversion for the first channel frequency-domain signal and the second channel frequency-domain signal, respectively.

13. The stereo decoding apparatus according to claim 12, wherein processing the monophonic frequency-domain signal according to the interchannel level difference and the interchannel phase difference to obtain the first channel frequency-domain signal and the second channel frequency-domain signal comprises:

processing energy of the monophonic frequency-domain signal according to the interchannel level difference to obtain energy of the first channel frequency-domain signal and energy of the second channel frequency-domain signal; and processing a phase of the monophonic frequency-domain signal according to the interchannel level difference and interchannel phase difference to obtain a phase of the first channel frequency-domain signal and a phase of the second channel frequency-domain signal.

14. The stereo decoding apparatus according to claim 12, wherein processing the monophonic frequency-domain signal according to the interchannel level difference and the interchannel phase difference to obtain the first channel frequency-domain signal and the second channel frequency-domain signal comprises:

processing energy of the monophonic frequency-domain signal according to the interchannel level difference to obtain energy of the first channel frequency-domain signal and energy of the second channel frequency-domain signal;

when the group delay is 0, processing a phase of the monophonic frequency-domain signal according to the interchannel level difference, interchannel phase difference, and group delay to obtain a phase of the first channel frequency-domain signal and a phase of the second channel frequency-domain signal; and when the group delay is not 0, processing a phase of the monophonic frequency-domain signal according to the interchannel level difference and interchannel phase difference to obtain a phase of the first channel frequency-domain signal and a phase of the second channel frequency-domain signal.

* * * * *